3,606,497
WEAR-PROTECTED WHEEL FOR A
TRACKLAYING VEHICLE
Martin Gilles, Cologne-Weidenpesch, Germany, assignor
  to Franz Clouth Rheinische Gummewarenfabrik AG,
  Cologne-Nippes, Germany
Filed Jan. 22, 1969, Ser. No. 793,013
Claims priority, application Germany, Jan. 26, 1968,
P 16 80 323.9
Int. Cl. B62d 55/14
U.S. Cl. 305—56        7 Claims

ABSTRACT OF THE DISCLOSURE

A wheel for a tracklaying vehicle has two flanges defining an annular recess for two cushions, each of which includes a steel ring and a rubber layer bonded to the ring and to one of the flanges. The teeth of the track enter the gap between the steel rings.

BACKGROUND OF THE INVENTION

The present invention relates to tracklaying vehicles and, more particularly, to improvements in wheels for tracklaying vehicles.

Wheels used for heavy vehicles such as tanks are advantageously made of light metal rather than of steel, in order to save weight. However, such wheels are often damaged by the constant friction and by repeated impact of the track guides against the wheel flanges.

A protection against wear developed in prior art includes a steel ring which is riveted onto the flanges because steel cannot be welded to aluminum. Such localized protection does not resist, in the long run, the deterioration of the wheel flanges due to lateral impacts of the track guides, due to different heat expansion coefficients of steel and light metal, or due to stretching of the track.

Similarly, spraying of molten steel onto the flanges of a light metal wheel was found to be ineffective as protection against wear; it could not prevent a deterioration which required a premature change of wheels, for instance, even before the rubber threads had worn off.

German Utility Model No. 1,865,401 discloses a wheel with two aluminum rings flanking two rings of wear-resistant spring steel. A drawback of such wheels is that the releasably connected parts are loosened by the vibrations and deform the track guides, so that the attrition of the wheel itself is accelerated and the driving safety is jeopardized due to a reduction in the width of the gap between the rings.

SUMMARY OF THE INVENTION

It is, therefore, an object of the present invention to provide a lightweight wheel for use in tracklaying vehicles which can stand extensive wear and tear.

This object is attained by providing the flanges of the wheel with cushions each of which includes a layer of rubber or other elastomeric material and a steel ring, and wherein the layers are bonded to the respective flanges and the corresponding rings.

According to one preferred embodiment of the invention, the rings and the flanges are vulcanized to opposite sides of the respective layers.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
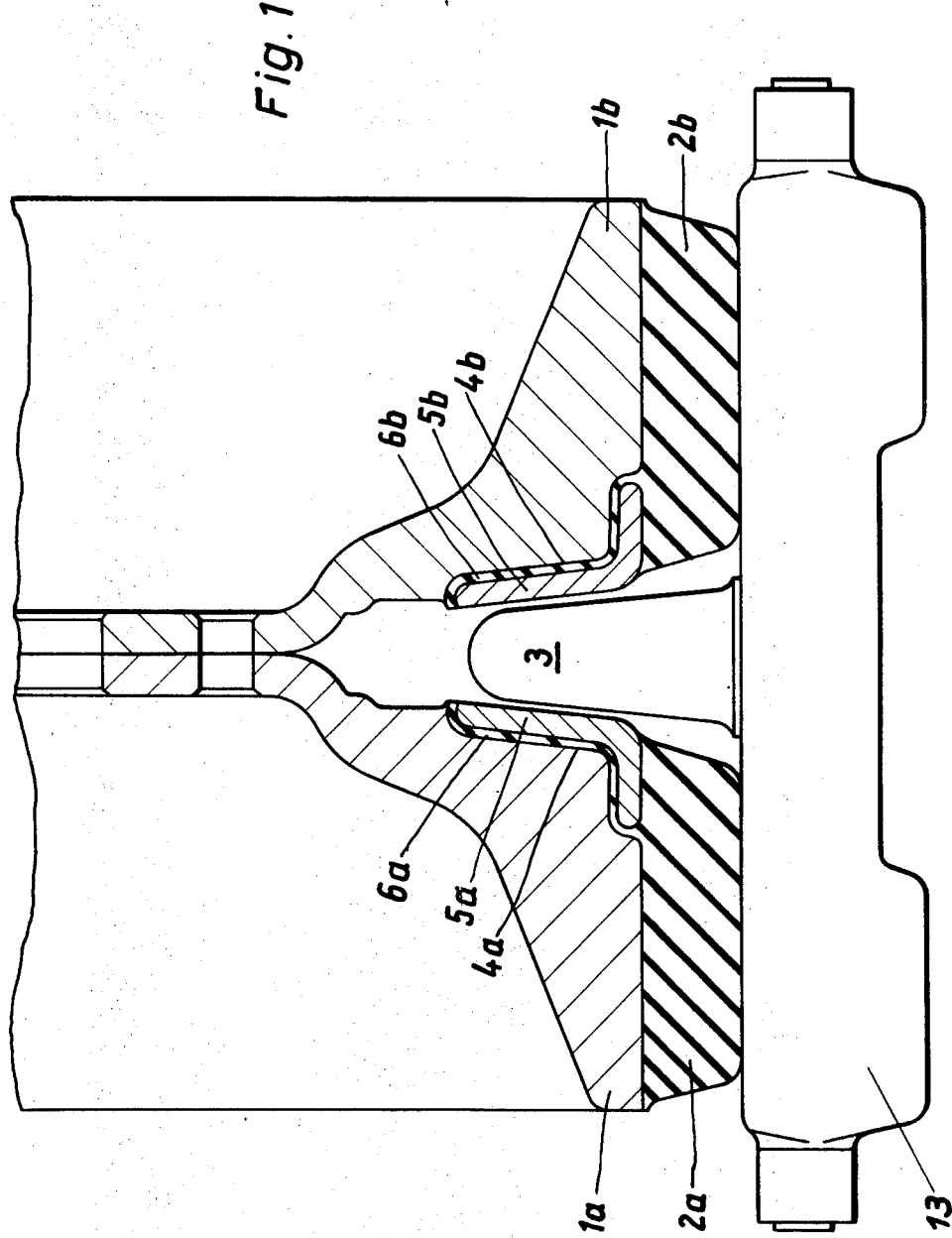
FIG. 1 is a cross-sectional view of a portion of a first wheel in a tracklaying vehicle.

FIG. 1 illustrates a portion of a wheel in a tracklaying vehicle. The wheel comprises a composite flange including two discrete flanges 1a, 1b which are secured to each other by rivets and have annular rims surrounded by solid rubber tires 2a, 2b. The outermost portions of the flanges 1a, 1b define between themselves an annular space or recess which extends from the periphery toward the center of the wheel and serves to receive projections or teeth 3 provided on an endless track which is trained around th wheel and a portion of which is shown at 13. In order to reduce wear on those portions of flanges 1a, 1b which flank the recess for the teeth 3, the wheel is provided with two yieldable cushions each of which is adjacent to one of the flanges 1a, 1b and each of which is accomodated in the recess. These cushions respectively comprise steel rings 5a, 5b and layers 6a, 6b of elastomeric material (preferably rubber) which are vulcanized to the respective flanges and to the corresponding rings. The cushions are accommodated in L-shaped cutouts or recesses 4a, 4b which are machined into the surfaces of the respective flanges. It will be noted that the two cushions and the two flanges are mirror symmetrical with reference to a plane which is normal to the wheel axis and extends between the flanges 1a, 1b. The thickness of elastomeric layers 6a, 6b is a fraction of the thickness of rings 5a, 5b which consist of sheet steel stock or other suitable wear-resistant metallic material. The flanges 1a, 1b consist of light metal, preferably aluminum. The thickness of layers 6a, 6b is sufficient to insure that the cushions can take up all such stresses which develop when the tracklaying vehicle travels on uneven terrain. The tires 2a, 2b form two annular elastic layers between the peripheral surfaces of flanges 1a, 1b and the links of the track 13. It will be noted that the width of the gap between the cushions in the recess between flanges 1a, 1b diminishes in a direction toward the center of the wheel. The teeth 3 of the track also taper in a direction toward the center of the wheel.

Figure 2:
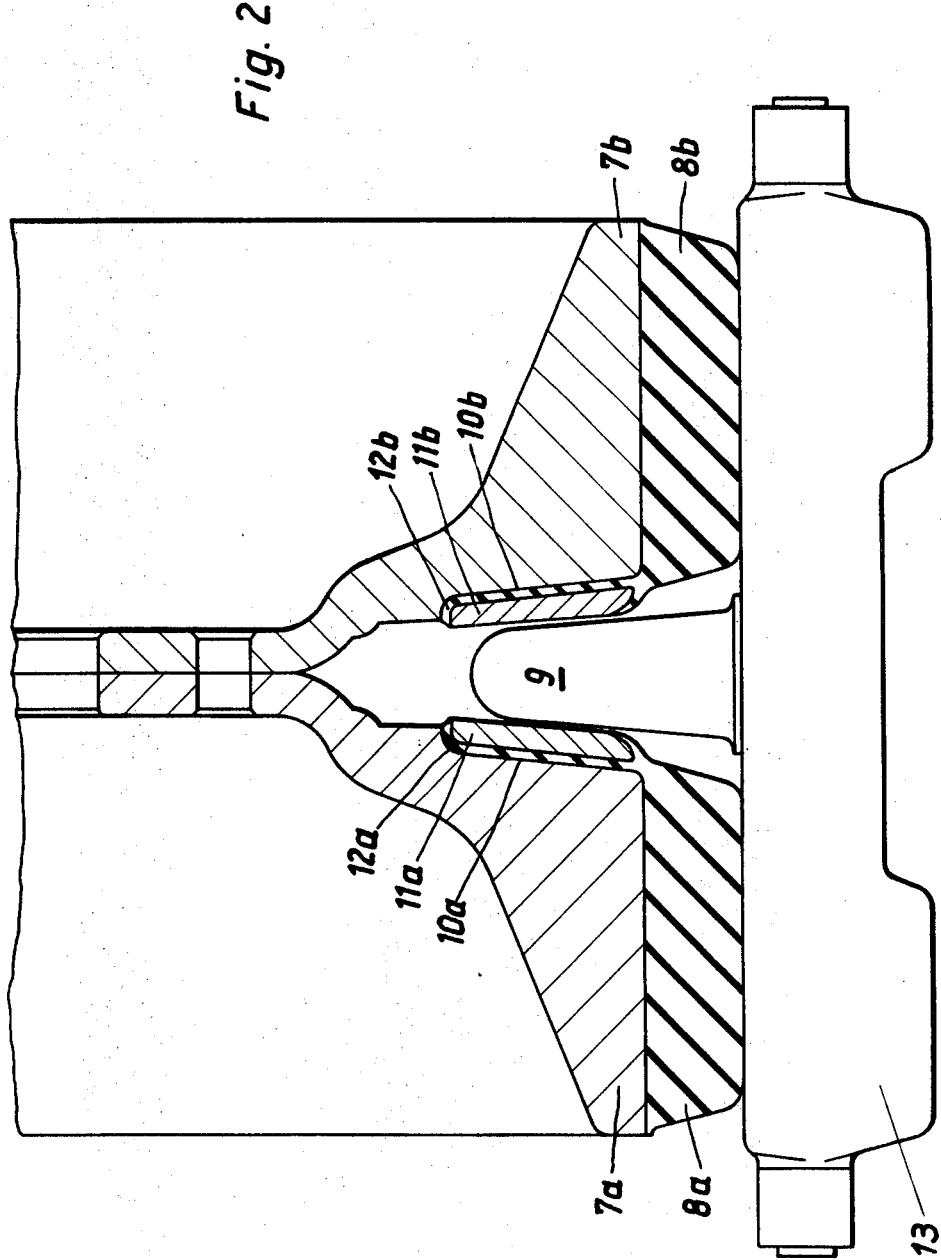
FIG. 2 is a cross-sectional view of a portion of a second wheel.

FIG. 2 shows a slightly modified wheel wherein the flanges 7a, 7b are provided with cushions including steel rings 11a, 11b and layers 12a, 12b of rubber or similar elastomeric material. The layers 12a, 12b are preferably integral with the tires 8a, 8b (the same holds true for the wheel of FIG. 1). Instead of employing rings of L-shaped cross-section (FIG. 1) the rings 11a, 11b of FIG. 2 are of substantially rectangular cross-sectional outline. One projection or tooth of the track is shown at 9. The numerals 10a, 10b denote the recesses of flanges 7a, 7b for the respective cushions.

The layers 6a, 6b or 12a, 12b establish reliable homogeneous bonds between the flanges and the respective rings all the way around the circumference of the wheel. These layers compensate for differences between heat-expansion coefficients of steel and light metal.

While the invention has been illustrated and described as embodied in a wheel for a tracklaying vehicle, it is not intended to be limited to the details shown, since various modifications and structural change may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a tracklaying vehicle, a combination comprising a wheel and an endless chain trained over said wheel and having a plurality of projections extending in the direction of said wheel, said wheel comprising two flanges defining an anuular space extending radially inwardly from the periphery toward the center of the wheel, said flanges having surfaces flanking said annular space and provided with recesses extending axially of said wheel, said wheel further comprising cushions provided in said recesses and each having a layer of elastomeric material and a steel ring, each of said layers being vulcanized to the respective flange and to the corresponding ring and said rings flanking the projections which extend into said annular space, each of said rings having a width in a radial direction closely approximating the radial dimension of said recess and having an outer surface located in said annular space and providing a continuation of the surface of the respective flange, the thickness of said rings as considered in the axial direction of said wheel exceeding the thickness of said layers.

2. A combination as defined in claim 1, wherein said flanges consist of light metal.

3. A combination as defined in claim 1, wherein said elastomeric material is rubber.

4. A combination as defined in claim 1, wherein said cushions define between themselves a gap whose width decreases in a direction toward the center of said wheel.

5. A combination as defined in claim 1, wherein said flanges and said cushions are mirror symmetrical with reference to a plane which is normal to the axis of said wheel and extends between said flanges.

6. A combination as defined in claim 1, wherein said flanges have peripheral surfaces and further comprising elastic tires surrounding said peripheral usrfaces.

7. A combination as defined in claim 1, wherein the thickness of said flanges increases in direction toward said annular space.

References Cited

UNITED STATES PATENTS

| | | | |
|---|---|---|---|
| 2,791,256 | 5/1957 | Sinclair | 152—47 |
| 2,984,524 | 5/1961 | Franzen | 305—56 |
| 3,007,745 | 11/1961 | Even | 305—56 |
| 3,263,315 | 8/1966 | O'Brien | 305—24UX |

FOREIGN PATENTS

| | | | |
|---|---|---|---|
| 737,756 | 7/1943 | Germany | 305—56 |

RICHARD J. JOHNSON, Primary Examiner

U.S. Cl. X.R.

74—230.7

UNITED STATES PATENT OFFICE
CERTIFICATE OF CORRECTION

Patent No. 3,606,497  Dated September 20, 1971

Inventor(s) Martin Gilles

It is certified that error appears in the above-identified patent and that said Letters Patent are hereby corrected as shown below:

In the heading to the printed specification, line 5, "Franz Clouth Rheinische Gummewarenfabrik AG" should read -- Clouth Gummiwerke Aktiengesellschaft -- .

Signed and sealed this 24th day of October 1972.

(SEAL)
Attest:

EDWARD M. FLETCHER, JR.
Attesting Officer

ROBERT GOTTSCHALK
Commissioner of Patents